United States Patent
Koike et al.

(10) Patent No.: US 12,195,400 B2
(45) Date of Patent: Jan. 14, 2025

(54) COMPOSITION FOR A HEAT TREATMENT JIG, AND METHOD OF MANUFACTURING A HEAT TREATMENT JIG

(71) Applicant: TYK CORPORATION, Tokyo (JP)

(72) Inventors: Yasuta Koike, Gifu (JP); Masataka Kubo, Gifu (JP)

(73) Assignee: TYK CORPORATION, Tokyo (JP)

( * ) Notice: Subject to any disclaimer, the term of this patent is extended or adjusted under 35 U.S.C. 154(b) by 603 days.

(21) Appl. No.: 17/213,793

(22) Filed: Mar. 26, 2021

(65) Prior Publication Data
US 2021/0300824 A1   Sep. 30, 2021

(30) Foreign Application Priority Data
Mar. 27, 2020 (JP) ................. 2020-059168

(51) Int. Cl.
C04B 35/14 (2006.01)
C04B 35/443 (2006.01)
F27D 3/12 (2006.01)

(52) U.S. Cl.
CPC ............ C04B 35/14 (2013.01); C04B 35/443 (2013.01); *C04B 2235/3222* (2013.01); *C04B 2235/3418* (2013.01); *C04B 2235/3481* (2013.01); *C04B 2235/5427* (2013.01); *C04B 2235/602* (2013.01); *F27D 3/12* (2013.01)

(58) Field of Classification Search
CPC .................. C04B 35/14; C04B 35/443; C04B 2235/3222; C04B 2235/3418; C04B 2235/5427; C04B 2235/602
See application file for complete search history.

(56) References Cited

FOREIGN PATENT DOCUMENTS

| | | | |
|---|---|---|---|
| CN | 103664153 A | | 3/2014 |
| CN | 105693227 A | | 6/2016 |
| CN | 109400137 A | | 3/2019 |
| CN | 109467422 A | | 3/2019 |
| JP | 2003165767 A | * | 6/2003 |
| JP | 2011117663 A | | 6/2011 |
| JP | 2014227327 A | * | 12/2014 |
| JP | 2014228239 A | | 12/2014 |
| KR | 1020090127805 A | | 12/2009 |

OTHER PUBLICATIONS

JP2014227327A machine translation (Year: 2014).*
JP2003165767A machine translation (Year: 2003).*

* cited by examiner

*Primary Examiner* — James A Fiorito
*Assistant Examiner* — Cameron K Miller
(74) *Attorney, Agent, or Firm* — HAUPTMAN HAM, LLP

(57) ABSTRACT

A composition for a heat treatment jig includes: alumina at a weight ratio within the range of 5% or more and 25% or less; mullite at a weight ratio within the range of 0% or more and 35% or less; cordierite at a weight ratio within the range of 15% or more and 35% or less; spinel at a weight ratio within the range of 0% or more and 35% or less; and fused silica at a weight ratio within the range of 15% or more and 50% or less. The composition for a heat treatment jig is used for the method of manufacturing a heat treatment jig, such as a heat treatment container.

3 Claims, 1 Drawing Sheet

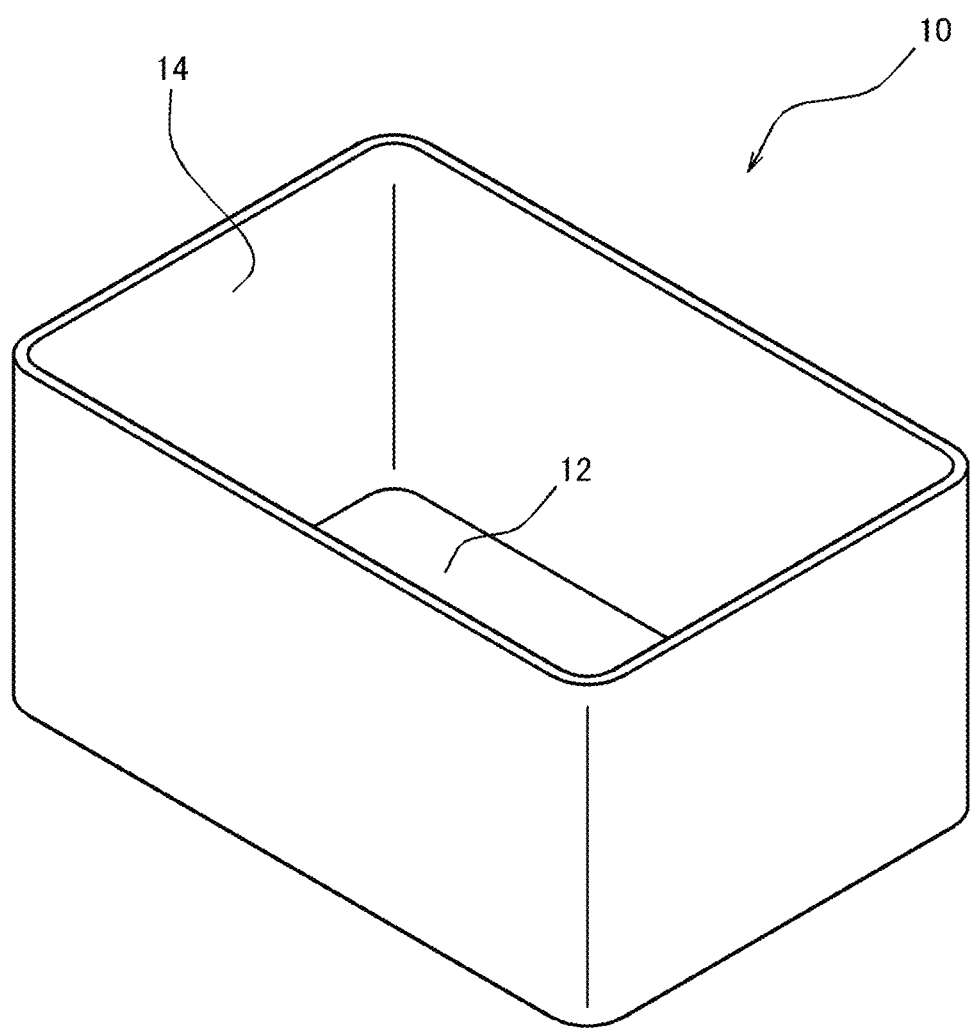

COMPOSITION FOR A HEAT TREATMENT JIG, AND METHOD OF MANUFACTURING A HEAT TREATMENT JIG

RELATED APPLICATIONS

The present application claims priority based on Japanese Patent Application No. 2020-59168, filed Mar. 27, 2020, the entire disclosure of which is herein incorporated by reference as a part of this application.

BACKGROUND OF THE INVENTION

1. Field of the Invention

The present invention relates to a composition for a heat treatment jig, and a method of manufacturing a heat treatment jig.

2. Description of the Related Art

A heat treatment jig, such as a heat treatment container disclosed in Japanese Patent Application Laid-open No. 2014-227327, has hitherto been used for heat treatment in, for example, the manufacturing of an positive electrode active material for lithium ion battery.

The heat treatment container disclosed in Japanese Patent Application Laid-open No. 2014-227327 is a bath-like container including a sheet-shaped horizontal bottom and a vertically arranged sheet-shaped wall portion formed on the entire peripheral edge portion of the horizontal bottom, which is formed by firing mixed powder containing alumina powder and the like. In the invention disclosed in Japanese Patent Application Laid-open No. 2014-227327, the mixed powder to be used for forming the heat treatment container contains 5% to 45% of alumina powder, 0% to 35% of mullite powder, 5% to 40% of cordierite powder, and 5% to 30% of spinel powder when the total mass thereof is defined as 100%. The heat treatment container formed by using such mixed powder exhibits a characteristic of being excellent in reaction resistance.

However, in recent years, from the viewpoint of, for example, improving manufacturing efficiency in, for example, the manufacturing of an positive electrode active material for lithium ion battery, there has been a demand for treatment such as forced air cooling of a heat treatment container having housed therein an positive electrode active material for lithium ion battery under the state of sill having high temperature (e.g., high temperature of about 500° C.). However, when such treatment is performed, the heat treatment container is highly liable to be broken. Accordingly, in the related art, in order to achieve, for example, an improvement in manufacturing efficiency of an positive electrode active material for lithium ion battery, there has been a demand for a heat treatment jig having high durability against temperature changes, or a method of manufacturing an positive electrode active material for lithium ion battery including using such heat treatment jig. In addition, there has been also a demand for a composition for a heat treatment jig suitable for satisfying those demands.

SUMMARY OF THE INVENTION

Based on such findings, an object of the present invention is to provide a composition for a heat treatment jig suitable for manufacturing a heat treatment jig or the like having high durability against temperature changes, a method of manufacturing a heat treatment jig including using the composition for a heat treatment jig, and a method of manufacturing an positive electrode active material for lithium ion battery including using the heat treatment jig.

(1) In order to achieve the above-mentioned object, according to at least one embodiment of the present invention, there is provided a composition for a heat treatment jig, including: alumina at a weight ratio within a range of 5% or more and 25% or less; mullite at a weight ratio within a range of 0% or more and 35% or less; cordierite at a weight ratio within a range of 15% or more and 35% or less; spinel at a weight ratio within a range of 0% or more and 35% or less; and fused silica at a weight ratio within a range of 15% or more and 50% or less.

(2) In the composition for a heat treatment jig according to at least one embodiment of the present invention, the fused silica desirably has an average particle diameter within a range of more than 0.1 mm and less than 1.5 mm.

(3) In order to achieve the above-mentioned object, according to at least one embodiment of the present invention, there is provided a method of manufacturing a heat treatment jig, including: molding the above-mentioned composition for a heat treatment jig; and firing the resultant molded product.

(4) According to at least one embodiment of the present invention, there is provided a method of manufacturing a heat treatment jig, including: molding a composition for a heat treatment jig which is obtained by blending alumina, cordierite, and fused silica, which contains the fused silica at a weight ratio within a range of 15% or more and 50% or less, and in which the fused silica has an average particle diameter of more than 0.1 mm and less than 1.5 mm; and firing the resultant molded product, to thereby manufacture a heat treatment jig having a coefficient of thermal shock fracture resistance R, which is represented by $R=\{\sigma \cdot(1-v)\}/(\alpha-E)$ [K], of 199 [K] or more, where $\sigma$[MPa] represents a fracture stress, $v$ represents a Poisson's ratio, $\alpha$[ppm/K] represents a thermal expansion coefficient, and E [GPa] represents a modulus of elasticity.

(5) In the method of manufacturing a heat treatment jig according to at least one embodiment of the present invention, the composition for a heat treatment jig to be used further contains at least one of mullite or spinel.

According to the present invention, the composition for a heat treatment jig suitable for providing a heat treatment jig or the like having high durability against temperature changes, the method of manufacturing a heat treatment jig including using the composition for a heat treatment jig, and the method of manufacturing an positive electrode active material for lithium ion battery including using the heat treatment jig can be provided.

BRIEF DESCRIPTION OF THE DRAWINGS

FIG. 1 is a perspective view for illustrating a heat treatment container manufactured by a method of manufacturing a heat treatment jig according to at least one Example of the present invention.

DESCRIPTION OF THE EMBODIMENTS

A composition for a heat treatment jig, a method of manufacturing a heat treatment jig including using the composition, and a method of manufacturing an positive electrode active material for lithium ion battery including using the heat treatment jig manufactured by the manufacturing method according to at least one embodiment of the present invention are described below.

The composition for a heat treatment jig taken as an example below in this embodiment can be suitably utilized in the manufacturing of, for example, a general jig for heat treatment, such as a heat treatment container including a so-called saggar or a crucible, a shelf plate, or a setter. In the heat treatment jig of this embodiment, the thickness of a wall portion in its thinnest portion is preferably from 9 mm to 12 mm. In addition, in the heat treatment jig of this embodiment, the thickness of the wall portion in a portion other than the thinnest portion is not particularly limited, but is preferably 16 mm or less.

The composition for a heat treatment jig of this embodiment is obtained by blending alumina, cordierite, and fused silica as materials thereof. The composition for a heat treatment jig may further contain any one or both of mullite and spinel in addition to those materials. More specifically, the composition for a heat treatment jig of this embodiment contains: alumina at a weight ratio within a range of 5% or more and 25% or less; mullite at a weight ratio within a range of 0% or more and 35% or less; cordierite at a weight ratio within a range of 15% or more and 35% or less; spinel at a weight ratio within a range of 0% or more and 35% or less; and fused silica at a weight ratio within a range of 15% or more and 50% or less.

The heat treatment jig of this embodiment is obtained by molding the above-mentioned composition for a heat treatment jig, followed by firing the resultant molded product. When manufactured from mixed powder of those ceramic powders, a heat treatment container according to at least one embodiment of the present invention is formed of porous ceramics, and hence has heat resistance.

In the composition for a heat treatment jig of this embodiment, alumina mainly exhibits an improving effect on reaction resistance to a compound to be heat treated. Accordingly, a heat treatment jig formed by firing the composition for a heat treatment jig of this embodiment exhibits high reaction resistance (also referred to as "corrosion resistance") to the compound to be heat treated.

Alumina is blended in the composition for a heat treatment jig of this embodiment at a weight ratio of 5% or more and 25% or less. With this configuration, a heat treatment jig capable of achieving high reaction resistance to the compound to be heat treated can be manufactured. When the content ratio of alumina powder is less than 5%, the effect exhibited by the incorporation of the alumina powder cannot be sufficiently exhibited in the heat treatment jig. When the content ratio of the alumina powder is more than 25%, the amounts of other components contained in the ceramic powders are relatively reduced, and the heat treatment jig can hardly exhibit desired characteristics.

In the composition for a heat treatment jig of this embodiment, cordierite mainly exhibits an improving effect on thermal shock resistance. Accordingly, the heat treatment jig formed by firing the composition for a heat treatment jig of this embodiment exhibits high thermal shock resistance.

Cordierite is blended in the composition for a heat treatment jig of this embodiment at a weight ratio of 15% or more and 35% or less. Accordingly, the heat treatment jig formed by firing the composition for a heat treatment jig of this embodiment has high thermal shock resistance. When the content ratio of the cordierite deviates from and falls below the above-mentioned range, the improving effect on thermal shock resistance is reduced in the heat treatment jig. In addition, when the content ratio of the cordierite deviates from and goes beyond the above-mentioned range, the heat treatment jig is liable to be contaminated with the compound to be heat treated. In particular, when the compound is a lithium-containing compound containing lithium, such as a ceramic material for an active material containing lithium oxide, contamination with the lithium-containing compound is liable to occur.

In the composition for a heat treatment jig of this embodiment, fused silica, which is a material having an extremely low thermal expansion coefficient in itself, mainly exhibits an improving effect on durability against thermal shock by reducing the thermal expansion coefficient of the composition for a heat treatment jig. Accordingly, the heat treatment jig formed by firing the composition for a heat treatment jig of this embodiment has a lower thermal expansion coefficient and higher durability against thermal shock than a heat treatment jig manufactured by using a composition for a heat treatment jig free of fused silica.

Fused silica is blended in the composition for a heat treatment jig of this embodiment at a weight ratio of 15% or more and 50% or less. Accordingly, the heat treatment jig formed by firing the composition for a heat treatment jig of this embodiment has characteristics of having a low thermal expansion coefficient and having high durability against thermal shock. When the blending amount of fused silica is less than 15%, a reduction in thermal expansion coefficient is insufficient, and the durability against thermal shock is not sufficiently improved. In addition, when the blending amount of fused silica is more than 50%, the reaction resistance (corrosion resistance) to the compound to be heat treated is reduced.

In addition, fused silica to be blended in the composition for a heat treatment jig of this embodiment has an average particle diameter within the range of more than 0.1 mm and less than 1.5 mm. With this configuration, the degree of reduction in modulus of elasticity at the time when thermal shock is repeatedly applied to the heat treatment jig can be suppressed. When the average particle diameter of fused silica is less than 0.1 mm or more than 1.5 mm, the reduction in modulus of elasticity at the time when thermal shock is repeatedly applied is increased. When the degree of reduction in modulus of elasticity at the time when thermal shock is repeatedly applied to the heat treatment jig is high, the heat treatment jig is liable to be broken owing to occurrence of cracks or the like.

In the composition for a heat treatment jig of this embodiment, mullite mainly exhibits an improving effect on the thermal shock resistance as with cordierite. Accordingly, the heat treatment jig formed by firing the composition for a heat treatment jig of this embodiment having mullite blended therein exhibits high thermal shock resistance.

Mullite is blended in the composition for a heat treatment jig of this embodiment at a weight ratio of 0% or more and 35% or less. Accordingly, the heat treatment jig formed by firing the composition for a heat treatment jig of this embodiment having mullite blended therein has a characteristic of having high thermal shock resistance to the compound to be heat treated. When the content ratio of mullite is more than 35%, the amounts of other components contained in the composition for a heat treatment jig are relatively reduced, and the heat treatment container can hardly exhibit desired characteristics in itself.

In the composition for a heat treatment jig of this embodiment, spinel mainly exhibits an improving effect on the reaction resistance. Accordingly, the heat treatment jig formed by firing the composition for a heat treatment jig of this embodiment having spinel blended therein exhibits high reaction resistance. The improving effect on the reaction resistance exhibited by spinel powder is particularly effective when the compound to be heat treated in the heat treatment container is a compound containing lithium, and is particularly excellently effective when the compound to be heat treated is a positive electrode active material for a lithium ion secondary battery.

Spinel is blended in the composition for a heat treatment jig of this embodiment at a weight ratio of 0% or more and 35% or less. Accordingly, the heat treatment jig formed by firing the composition for a heat treatment jig of this embodiment having spinel blended therein has a characteristic of having high reaction resistance to the compound to be heat treated. When the content ratio of spinel is more than 35%, the amounts of other components contained in the composition for a heat treatment jig are relatively reduced, and the heat treatment container can hardly exhibit desired characteristics in itself.

The composition for a heat treatment jig of this embodiment desirably contains, for example, a conventionally known additive. The additive to be added to the composition for a heat treatment jig of this embodiment is desirably an additive that does not cause changes in characteristics of the heat treatment container out of conventional additives used for heat treatment containers, such as a compound that disappears along with firing of a molded body, or a binder. For example, when the composition for a heat treatment jig of this embodiment contains a binder, an improving effect on the moldability of the heat treatment jig, a reducing effect on the manufacturing cost of the heat treatment jig, an increasing effect on the yield of the heat treatment jig, and the like can be expected.

The method of manufacturing a heat treatment jig of this embodiment can be performed by molding the above-mentioned composition for a heat treatment jig into a predetermined shape, followed by firing the resultant molded product under predetermined conditions. The firing conditions may be appropriately set, but the firing is desirably performed, for example, at a maximum temperature of from 1,250° C. to 1,400° C., preferably from 1,280° C. to 1,350° C. for a predetermined period of time. In order to prevent the decomposition of cordierite due to sintering, the firing temperature is desirably 1,400° C. or less. In addition, in order to suppress after-expansion due to fused silica turned into a cristobalite structure, the firing time is desirably as short as possible, and is preferably from 1 hour to 3 hours.

Herein, in terms of generalities, the incorporation of fused silica in the composition for a heat treatment jig is also considered as a fear for the corrosion resistance as described above. However, as described above, it is conceived that, when fused silica is incorporated in the composition for a heat treatment jig, a heat treatment jig having high durability against thermal expansion can be manufactured by utilizing a gap (so-called microcrack), which is formed when fused silica expands and shrinks in the process of manufacturing the heat treatment jig by firing the composition for a heat treatment jig, for reducing the thermal expansion coefficient, as well as the low thermal expansion properties of fused silica. Accordingly, it is conceived that, when fused silica is incorporated in the composition for a heat treatment jig while elimination of a problem (issue) serving as a fear for the corrosion resistance is considered, so-called trade-off issues, that is, the ensuring of the corrosion resistance and the reduction of the thermal expansion coefficient, can be achieved.

In order to solve the above-mentioned problem, as described above, the composition for a heat treatment jig of this embodiment contains: alumina at a weight ratio within a range of 5% or more and 25% or less; mullite at a weight ratio within a range of 0% or more and 35% or less; cordierite at a weight ratio within a range of 15% or more and 35% or less; spinel at a weight ratio within a range of 0% or more and 35% or less; and fused silica at a weight ratio within a range of 15% or more and 50% or less. As described above, when not only alumina, mullite, cordierite, and spinel are blended at predetermined weight ratios, but also fused silica is blended at a weight ratio within the range of 15% or more and 50% or less, the thermal expansion coefficient of a fired product obtained by firing the composition can be reduced, and a heat treatment jig without a problem with corrosion resistance can be manufactured.

In addition, as a result of extensive investigations, the inventors of the present invention have found that, when the average particle diameter of fused silica is set to fall within the range of more than 0.1 mm and less than 1.5 mm, there distinctly appears a suppressing effect on the degree of degradation of the heat treatment jig manufactured by using the composition for a heat treatment jig when thermal shock is applied thereto. Accordingly, when fused silica is blended in the composition for a heat treatment jig, it is desired to blend medium-grained fused silica having an average particle diameter of more than 0.1 mm and less than 1.5 mm, rather than fine-grained fused silica having an average particle diameter of 0.1 mm or less or coarse-grained fused silica having an average particle diameter of 1.5 mm or more.

In addition, when a composition which is obtained by blending alumina, cordierite, and fused silica, which contains the fused silica at a weight ratio within a range of 15% or more and 50% or less, and in which the fused silica has an average particle diameter of more than 0.1 mm and less than 1.5 mm, like the composition for a heat treatment jig taken as an example in this embodiment, is molded, followed by firing the resultant molded product, a heat treatment jig having a coefficient of thermal shock fracture resistance R of 199 [K] or more can be manufactured. According to such manufacturing method, a heat treatment jig exhibiting excellent characteristics against thermal shock can be manufactured.

In addition, also when a composition for a heat treatment jig further containing mullite or spinel in addition to alumina, cordierite, and fused silica, like the composition for a heat treatment jig taken as an example in this embodiment, is used, a heat treatment jig exhibiting excellent characteristics against thermal shock can be similarly manufactured. In addition, when the composition for a heat treatment jig contains spinel, the improving effect on corrosion resistance can also be expected.

When the heat treatment jig manufactured by the manufacturing method including using the composition for a heat treatment jig taken as an example in this embodiment is used, an active material for a lithium ion secondary battery can be suitably manufactured. Specifically, when a ceramic material for an active material containing lithium oxide is fired under temperature conditions (e.g., high temperature conditions of from about 800° C. to about 1,100° C.) suitable for firing of the ceramic material through use of the heat treatment jig, an active material for a lithium ion secondary battery can be manufactured.

EXAMPLES

The composition for a heat treatment jig, the method of manufacturing a heat treatment jig, and the method of manufacturing an positive electrode active material for lithium ion battery of the present invention are specifically described below by way of Examples. In these Examples, as an example of the heat treatment jig, a saggar having a bath-like appearance with an opening on a top side as illustrated in FIG. 1 was produced as a heat treatment container 10. The heat treatment container 10 may be used for, for example, applications such as firing of a ceramic material for an active material containing lithium oxide serving as a compound to be heat treated.

The heat treatment container 10 illustrated in FIG. 1 includes a horizontal bottom 12 and a vertical wall 14. The horizontal bottom 12 has a sheet shape, and in planar view, may have a rectangular shape, a circular shape, or the like (rectangular shape in the illustrated example). In addition, the vertical wall 14 is a portion formed so as to be vertically arranged on the entire peripheral edge portion of the horizontal bottom 12. The heat treatment container 10 in FIG. 1 was produced so as to have a thickness of from 9 mm to 12 mm in the thinnest portion in the horizontal bottom 12 and the vertical wall 14, and have a thickness of 16 mm or less in a portion other than the thinnest portion.

In addition, a plurality of kinds of compositions for a heat treatment jig were prepared as samples by preparing alumina, mullite, cordierite, spinel, and fused silica, and weighing and mixing these materials at weight ratios shown in Tables 1 to 3 below. In addition, each of the samples was subjected to evaluation tests by test methods described below, and the results thereof are shown in Tables 1 to 3. In Tables 1 to 3 below, the compositions for a heat treatment jig represented by the same sample name contain components at the same weight ratios.

TABLE 1

|  |  | Example 1 | Example 2 | Example 3 | Example 4 | Example 5 | Comparative Example 1 | Comparative Example 5 | Comparative Example 6 |
|---|---|---|---|---|---|---|---|---|---|
| Weight ratio (wt %) of fused silica | | 35 | 30 | 40 | 50 | 20 | 0 | 10 | 60 |
| Particle diameter | 1.5 mm or more | 0 | 0 | 0 | 0 | 0 | 0 | 0 | 0 |
| | 1.5 mm to 0.1 mm | 35 | 30 | 35 | 40 | 20 | 0 | 10 | 60 |
| | 0.1 mm or less | 0 | 0 | 5 | 10 | 0 | 0 | 0 | 0 |
| Weight ratios (wt %) of other raw materials | | | | | | | | | |
| | Alumina | 10 | 10 | 10 | 10 | 5 | 10 | 10 | 10 |
| | Mullite | 12.5 | 12.5 | 12.5 | 12.5 | 32.5 | 42.5 | 32.5 | 0 |
| | Cordierite | 30 | 35 | 25 | 15 | 30 | 35 | 35 | 17.5 |
| | Spinel | 0 | 0 | 0 | 0 | 0 | 0 | 0 | 0 |
| | Clay | 12.5 | 12.5 | 12.5 | 12.5 | 12.5 | 12.5 | 12.5 | 12.5 |
| Thermal expansion coefficient (%) at 1,000° C. | | 0.17 | 0.18 | 0.16 | 0.14 | 0.19 | 0.28 | 0.24 | 0.14 |
| Rate (%) of reduction in thermal expansion coefficient | | 60.7% | 64.3% | 57.1% | 50.0% | 67.9% | 100% | 85.7% | 50.0% |
| Flexural stress (MPa) | | 8.1 | 9.6 | 6.5 | 7.9 | 7.2 | 5.1 | 5.8 | 9.8 |
| Modulus of elasticity (GPa) | | 12.1 | 12.7 | 8.2 | 13.1 | 11.3 | 9.3 | 10.8 | 14.3 |
| Coefficient of thermal shock fracture resistance (K) | | 315.0 | 336.0 | 396.3 | 344.6 | 268.3 | 156.7 | 179.0 | 391.6 |
| Ratio (%) of deterioration caused by thermal shock | | 52.0 | 51.2 | 50.7 | 63.6 | 52.7 | 45.2 | 46.0 | 51.6 |
| Reaction resistance | | ○ | ○ | ○ | ○ | ○ | ○ | ○ | × |

TABLE 2

|  |  | Example 6 | Example 7 | Comparative Example 2 |
|---|---|---|---|---|
| Weight ratio (wt %) of fused silica | | 15 | 20 | 0 |
| Particle diameter | 1.5 mm or more | 0 | 0 | 0 |
| | 1.5 mm to 0.1 mm | 15 | 20 | 0 |
| | 0.1 mm or less | 0 | 0 | 0 |
| Weight ratios (wt %) of other raw materials | | | | |
| | Alumina | 25 | 25 | 25 |
| | Mullite | 0 | 0 | 20 |
| | Cordierite | 15 | 15 | 15 |
| | Spinel | 35 | 30 | 30 |
| | Clay | 10 | 10 | 10 |
| Thermal expansion coefficient (%) at 1,000° C. | | 0.32 | 0.31 | 0.43 |
| Rate (%) of reduction in thermal expansion coefficient | | 74.4% | 72.1% | 100% |
| Flexural stress (MPa) | | 4.7 | 5.1 | 8.7 |
| Modulus of elasticity (GPa) | | 5.9 | 5.2 | 11.8 |
| Coefficient of thermal shock fracture resistance (K) | | 199.2 | 253.1 | 137.2 |
| Ratio (%) of deterioration caused by thermal shock | | 54.4 | 54.0 | 36.2 |
| Reaction resistance | | ○ | ○ | ○ |

TABLE 3

|  |  | Example 1 | Comparative Example 3 | Comparative Example 4 |
|---|---|---|---|---|
| Weight ratio (wt %) of fused silica |  | 35 | 35 | 35 |
| Particle diameter | 1.5 mm or more | 0 | 25 | 0 |
|  | 1.5 mm to 0.1 mm | 35 | 10 | 15 |
|  | 0.1 mm or less | 0 | 0 | 20 |
| Weight ratios (wt %) of other raw materials |  |  |  |  |
|  | Alumina | 10 | 10 | 10 |
|  | Mullite | 12.5 | 12.5 | 12.5 |
|  | Cordierite | 30 | 30 | 30 |
|  | Spinel | 0 | 0 | 0 |
|  | Clay | 12.5 | 12.5 | 12.5 |
| Thermal expansion coefficient (%) at 1,000° C. |  | 0.17 | 0.19 | 0.2 |
| Rate (%) of reduction in thermal expansion coefficient |  | 60.7% | 67.9% | 71.4% |
| Flexural stress (MPa) |  | 8.1 | 4.6 | 10.2 |
| Modulus of elasticity (GPa) |  | 12.1 | 6.2 | 19.1 |
| Coefficient of thermal shock fracture resistance (K) |  | 315.0 | 312.4 | 213.6 |
| Ratio (%) of deterioration caused by thermal shock |  | 52.0 | 40.5 | 38.2 |
| Reaction resistance |  | ○ | ○ | ○ |

<<With Regard to Test Methods>>

(a) With Regard to Thermal Expansion Coefficient, and Rate of Reduction in Thermal Expansion Coefficient For each of the samples described above, a product molded into a size of 8 mm by 8 mm by 25 mm was prepared, and was measured for an elongation between normal temperature and 1,000° C. with a thermal dilatometer. The elongation was represented in percentage with respect to the length of the product at normal temperature. In addition, the rates of reduction in thermal expansion coefficient of the samples according to Example 1 to Example 5 were calculated based on the thermal expansion coefficient of the sample according to Comparative Example 1 as a reference. The rates of reduction in thermal expansion coefficient of the samples according to Example 6 and Example 7 were calculated based on the thermal expansion coefficient of the sample according to Comparative Example 2 as a reference.

(b) With Regard to Flexural Stress

For each of the samples described above, a product molded into a size of 10 mm by 10 mm by 60 mm was prepared. The resultant sample was measured for three-point flexural strength in conformity with JIS R1604 at normal temperature and at a length of the support span of 40 mm.

(c) With Regard to Modulus of Elasticity

For each of the samples described above, a product molded into a sheet shape measuring 100 mm by 50 mm by 10 mm was prepared, and was measured for a modulus of elasticity at normal temperature with an elastometer.

(d) With Regard to Coefficient of Thermal Shock Fracture Resistance

The coefficient of thermal shock fracture resistance of each of the samples described above was derived based on the following (Mathematical Expression 1) by using the numerical values for the thermal expansion coefficient, the flexural stress, and the modulus of elasticity obtained by the tests (a) to (c) described above. As described above, the thermal expansion coefficient is a numerical value obtained by measuring an elongation from normal temperature to 1,000° C., and representing the elongation in percentage with respect to the length of the product at normal temperature, and the flexural stress and the modulus of elasticity are numerical values at normal temperature.

(Mathematical Expression 1)

$$R = \frac{\sigma(1-v)}{\alpha E} \quad \text{(Mathematical Expression 1)}$$

(e) With Regard to Evaluation Test of Deterioration Caused by Thermal Shock

A evaluation test of deterioration caused by thermal shock was performed on each of the samples described above in order to evaluate the progression degree of degradation when thermal shock was repeatedly applied thereto. Specifically, for each of the samples described above, a product molded into a sheet shape measuring 100 mm by 50 mm by 10 mm was prepared, and the resultant sample was subjected to a test in which a series of events including (1) heating at 1,000° C. for 30 minutes, (2) dropping into water, and (3) measuring a modulus of elasticity were repeatedly performed five times. The progression degree of degradation when thermal shock was repeatedly applied was evaluated by representing, in percentage, the rate of change (rate of degradation) from an initial modulus of elasticity of each sample to a modulus of elasticity thereof after the five times of the test.

(f) With Regard to Reaction Resistance (Corrosion Resistance)

A test for evaluating reaction resistance (corrosion resistance) to a compound to be heat treated was performed on each of the samples described above. Specifically, lithium carbonate powder ($Li_2CO_3$), cobalt oxide powder ($Co_3O_4$), manganese dioxide powder ($MnO_2$), and nickel hydroxide powder ($Ni(OH)_2$) were weighed at 3/2 mol %, 1/3 mol %, 1 mol %, and 1 mol %, respectively, and were sufficiently mixed and then molded into a disc pellet shape. The pellet was molded so as to give a diameter of φ18 mm, a thickness of 5 mm, and a weight of 4 g.

The pellet having been produced as described above was placed on the surface (center portion of a horizontal bottom) of a saggar obtained by molding each of the samples into a shape of the heat treatment container 10 of FIG. 1, followed by firing, and was fired by arranging the saggar in a firing furnace. The pellet was fired by being increased in temperature up to 1,100° C. over 4 hours under the air atmosphere, retained at 1,100° C. for 4 hours after having been increased in temperature, and then left to cool under the air atmosphere. In addition, after having been left to cool, the pellet on the surface of the heat treatment container formed of the sample was removed. An unfired pellet separately prepared was placed on the same position, and was fired under the same treatment conditions as those of the previous firing. Such firing of the pellet was repeated 20 times, and the sample after the firing was observed. The observation of the sample after the firing was performed by focusing on whether or not a dent occurred. As a result of the observation, a case in which a dent occurred was evaluated as having low corrosion resistance to lithium contained in the pellet (lithium-containing compound), and a case in which no dent occurred was evaluated as having high corrosion resistance to lithium.

<<With Regard to Test Results>>

The results of the tests described above are described below based on Tables 1 to 3 above.

[With Regard to Test Results Shown in Table 1]

With regard to Example 1 to Example 5, in each of which alumina is contained at a weight ratio within the range of 5% or more and 25% or less, mullite is contained at a weight ratio within the range of 0% or more and 35% or less, cordierite is contained at a weight ratio within the range of 15% or more and 35% or less, fused silica is contained at a weight ratio within the range of 20% or more and 50% or less, and clay is contained at a weight ratio of 12.5%, and Comparative Example 1, Comparative Example 5, and Comparative Example 6, the test results of the tests described above are summarized in Table 1.

In the test examples summarized in Table 1, Example 1 to Example 5, Comparative Example 1, Comparative Example 5, and Comparative Example 6 differ from each other in the presence or absence of fused silica in the composition for a heat treatment jig or in weight ratio of fused silica. Accordingly, according to Table 1, effects exhibited by the presence or absence of fused silica in the composition for a heat treatment jig or by the weight ratio of fused silica on the characteristics required for the heat treatment jig can be understood. In addition, Examples and Comparative Examples listed in Table 1 are each free of spinel. Accordingly, with reference to Table 1, it can also be understood whether or not sufficient characteristics as the heat treatment jig are obtained under the state in which the suppressing effect on reaction resistance (corrosion resistance) to lithium exhibited by blending of spinel is not exerted. Based on those viewpoints, the test results summarized in Table 1 are discussed below for each test.

First, with regard to Examples and Comparative Examples listed in Table 1, the thermal expansion coefficient was discussed. As a result, it was found that Example 1 to Example 5, Comparative Example 5, and Comparative Example 6, in each of which fused silica was contained in the composition for a heat treatment jig, tended to be reduced in thermal expansion coefficient as compared to Comparative Example 1, in which fused silica was not contained. In addition, it was found that the thermal expansion coefficient tended to be reduced as the weight ratio of fused silica increased up to 50 wt %. Accordingly, it was found that, when fused silica was blended in the composition for a heat treatment jig, a reducing effect on the thermal expansion coefficient was exhibited. In addition, based on the results of the rates of reduction in thermal expansion coefficient of Examples and Comparative Examples represented in percentage with respect to the thermal expansion coefficient of Comparative Example 1 free of fused silica as a reference (100%), an effect exhibited by a change in content of fused silica on the thermal expansion coefficient was discussed. As a result, it was found that, while the rate of reduction in thermal expansion coefficient was 85.7% when the weight ratio of fused silica was 10 wt %, the rate of reduction in thermal expansion coefficient was significantly reduced to 67.9% when the weight ratio of fused silica was increased to 20 wt %. Based on the results, it was found that, when the weight ratio of fused silica was increased to more than 10 wt %, a significant effect was obtained in terms of thermal expansion coefficient.

In addition, with regard to Examples and Comparative Examples listed in Table 1, the coefficient of thermal shock fracture resistance was derived and discussed. The coefficient of thermal shock fracture resistance was derived as follows: the numerical values (see Table 1) for the thermal expansion coefficient, the flexural stress, and the modulus of elasticity were experimentally derived, and these numerical values were plugged in the above-mentioned (Mathematical Expression 1), to thereby calculate the coefficient of thermal shock fracture resistance. As a result, Example 1 to Example 5, Comparative Example 5, and Comparative Example 6, in each of which fused silica was contained in the composition for a heat treatment jig, each had a higher coefficient of thermal shock fracture resistance than Comparative Example 1, in which fused silica was not contained. Accordingly, it was found that the blending of fused silica in the composition for a heat treatment jig was able to contribute to an increase in coefficient of thermal shock fracture resistance. In addition, from the results, it was found that, while the coefficient of thermal shock fracture resistance was 179.0 [K] when the weight ratio of fused silica was 10 wt %, the coefficient of thermal shock fracture resistance was increased up to 268.3 [K] when the weight ratio of fused silica was increased to 20 wt %. Based on the results, it was found that, when the weight ratio of fused silica was increased to more than 10 wt %, a significant effect was obtained in terms of coefficient of thermal shock fracture resistance.

Subsequently, with regard to Examples and Comparative Examples listed in Table 1, the evaluation test of deterioration caused by thermal shock was performed, and the ratio of deterioration caused by thermal shock was derived. As a result, it was found that Example 1 to Example 5, Comparative Example 5, and Comparative Example 6, in each of which fused silica was contained in the composition for a heat treatment jig, each tended to be improved in ratio of deterioration caused by thermal shock as compared to Comparative Example 1, in which fused silica was not contained. In addition, it was found that, while the ratio of deterioration caused by thermal shock was 46.0% when the weight ratio of fused silica was 10 wt %, which was only slightly higher than the result of the case free of fused silica, 45.0%, the ratio of deterioration caused by thermal shock was increased up to 52.7% when the weight ratio of fused silica was increased to 20 wt %. Based on the results, it was found that, when the weight ratio of fused silica was increased to more than 10 wt %, a significant effect was obtained in terms of ratio of deterioration caused by thermal shock.

With regard to Examples and Comparative Examples listed in Table 1, the test for evaluating reaction resistance (corrosion resistance) was performed in addition to the tests described above. As a result, in each the compositions for a heat treatment jig, in each of which fused silica was contained at a weight ratio within the range of from 10 wt % to 50 wt %, and Comparative Example 1, in which fused silica was not contained, the result was that there was no problem in terms of reaction resistance. Meanwhile, in Comparative Example 6, in which fused silica was contained at a weight ratio of 60 wt %, the result was that there was a problem with reaction resistance. Based on the results, it was found that, when the blended amount of fused silica was increased up to the range of more than 50 wt % in terms of weight ratio, there was a fear that a problem with reaction resistance would occur.

[With Regard to Test Results Shown in Table 2]

With regard to Example 6 and Example 7, in each of which alumina is contained at a weight ratio of 25%, mullite is contained at a weight ratio within the range of 0% or more and 20% or less, cordierite is contained at a weight ratio of 15%, spinel is contained at a weight ratio within the range of 30% or more and 35% or less, fused silica is contained at a weight ratio within the range of 0% or more and 20% or less, and clay is contained at a weight ratio of 10%, and Comparative Example 2, the test results of the tests described above are summarized in Table 2.

In the test examples summarized in Table 2, Example 6, Example 7, and Comparative Example 2 differ from each other in the presence or absence of fused silica in the composition for a heat treatment jig or in weight ratio of fused silica. In addition, in each of Example 6, Example 7, and Comparative Example 2 listed in Table 2, spinel is contained. Accordingly, according to Table 2, effects exhibited by blending of fused silica in the composition for a heat treatment jig containing spinel on the characteristics required for the heat treatment jig can be understood. The test results summarized in Table 2 are discussed below for each test.

First, with regard to Examples and Comparative Example listed in Table 2, the thermal expansion coefficient was discussed. As a result, it was found that Example 6 and Example 7, in each of which fused silica was contained in the composition for a heat treatment jig, tended to be reduced in thermal expansion coefficient as compared to Comparative Example 2, in which fused silica was not contained. Accordingly, it was found that, also when fused silica was blended in the composition for a heat treatment jig containing spinel, a reducing effect on the thermal expansion coefficient was exhibited. In addition, also based on the results of the rates of reduction in thermal expansion coefficient of Examples represented in percentage with respect to the thermal expansion coefficient of Comparative Example 2 free of fused silica as a reference (100%), it was revealed that, when fused silica was incorporated, a sufficient rate of reduction was obtained. Based on the results, it was found that a reducing effect on the thermal expansion coefficient was obtained also in the case of the composition for a heat treatment jig containing spinel, and when the weight ratio of fused silica was set to 15 wt % or more, a significant effect was obtained as with the findings obtained in Table 1 above.

In addition, with regard to Examples and Comparative Example listed in Table 2, the coefficient of thermal shock fracture resistance was derived and discussed. The coefficient of thermal shock fracture resistance was derived as follows: the numerical values for the thermal expansion coefficient, the flexural stress, and the modulus of elasticity measured in Example 6, Example 7, and Comparative Example 2 were experimentally derived as shown in Table 2, and these numerical values were plugged in the above-mentioned (Mathematical Expression 1), to thereby calculate the coefficient of thermal shock fracture resistance. As a result, Example 6 and Example 7, in each of which fused silica was contained in the composition for a heat treatment jig, each had a higher coefficient of thermal shock fracture resistance than Comparative Example 2, in which fused silica was not contained. Accordingly, it was found that, even in the case of the composition for a heat treatment jig containing spinel, the blending of fused silica at a weight ratio of 15 wt % or more was able to contribute to an increase in coefficient of thermal shock fracture resistance.

Subsequently, with regard to Example 6, Example 7, and Comparative Example 2 listed in Table 2, the evaluation test of deterioration caused by thermal shock was performed, and the ratio of deterioration caused by thermal shock was derived. As a result, it was found that, also in the case of the composition for a heat treatment jig containing spinel, Example 6 and Example 7, in each of which fused silica was contained, each tended to be improved in ratio of deterioration caused by thermal shock as compared to Comparative Example 2, in which fused silica was not contained. In addition, it was found that, when the weight ratio of fused silica was increased to 15 wt % or more, a significant effect was obtained in terms of ratio of deterioration caused by thermal shock.

With regard to Example 6, Example 7, and Comparative Example 2 listed in Table 2, the test for evaluating reaction resistance (corrosion resistance) was performed in addition to the tests described above. As a result, in each of Example 6, Example 7, and Comparative Example 2, the result was that there was no problem in terms of reaction resistance.

[With Regard to Test Results Shown in Table 3]

With regard to Example 1, Comparative Example 3, and Comparative Example 4, in each of which alumina is contained at a weight ratio of 10%, mullite is contained at a weight ratio of 12.5%, cordierite is contained at a weight ratio of 30%, fused silica is contained at a weight ratio of 35%, and clay is contained at a weight ratio of 12.5%, the test results of the tests described above are summarized in Table 3. Summarized in Table 3 are the experimental results obtained in Example and Comparative Examples in which the constituent components of the composition for a heat treatment jig are contained at the same weight ratios, and fused silica has different average particle diameters. Specifically, Example 1 is an example in which fused silica has an average particle diameter within the range of more than 0.1 mm and less than 1.5 mm. Meanwhile, Comparative Example 3 is an example in which part of fused silica to be used has an average particle diameter of 1.5 mm or more, and Comparative Example 4 is an example in which part of fused silica to be used has an average particle diameter of 0.1 mm or less. Based on the test results summarized in Table 3, effects exhibited by the average particle diameter of fused silica on physical property values are discussed below.

First, with regard to Example 1, Comparative Example 3, and Comparative Example 4 listed in Table 3, the thermal expansion coefficients were discussed. The thermal expansion coefficients were 0.19 and 0.2 in Comparative Examples, which showed little difference from that of Example. In addition, the rates of reduction in thermal expansion coefficient obtained in Example 1, Comparative Example 3, and Comparative Example 4, in which fused silica was contained at the same weight ratio (35%), were calculated in percentage with respect to the thermal expansion coefficient of Comparative Example 1 (composition for a heat treatment jig free of fused silica) shown in Table 1 as a reference. As a result, in each of Example 1, Comparative Example 3, and Comparative Example 4, a sufficient reducing effect on the thermal expansion coefficient was observed. From this fact, it was revealed that the size of the average particle diameter of fused silica blended in the composition for a heat treatment jig slightly affected the thermal expansion coefficient. Accordingly, based on the experimental results shown in Tables 1 and 2, it was found that, when fused silica was incorporated at a weight ratio within the range of 15% or more and 50% or less, a significant effect was obtained from the viewpoint of improving the thermal expansion coefficient.

In addition, with regard to Example 1, Comparative Example 3, and Comparative Example 4 listed in Table 3, the coefficient of thermal shock fracture resistance was derived and discussed. The coefficient of thermal shock fracture resistance was derived as follows: in the same manner as in Examples and Comparative Examples shown in Tables 1 and 2, the numerical values for the thermal expansion coefficient, the flexural stress, and the modulus of elasticity were experimentally derived, and these numerical values were plugged in the above-mentioned (Mathematical Expression 1), to thereby calculate the coefficient of thermal shock fracture resistance. As a result, it was revealed that, in each of Example 1, Comparative Example 3, and Comparative Example 4, the coefficient of thermal shock fracture resistance was higher than 199 [K], and showed a value sufficient for use as the heat treatment jig. Based on the results, it was revealed that, while the blending of fused silica in the composition for a heat treatment jig was able to contribute to an increase in coefficient of thermal shock fracture resistance as in the results discussed in Tables 1 and 2, the size of the average particle diameter thereof slightly affected the coefficient of thermal shock fracture resistance.

Subsequently, with regard to Example 1, Comparative Example 3, and Comparative Example 4 listed in Table 3, the evaluation test of deterioration caused by thermal shock was performed, and the ratio of deterioration caused by thermal shock was derived. As a result, it was found that Example 1, in which fused silica had an average particle diameter within the range of more than 0.1 mm and less than 1.5 mm, showed less thermal shock degradation (higher degree (%) of thermal shock degradation) than Comparative Example 3, in which part of fused silica to be used had an average particle diameter of 1.5 mm or more, or Comparative Example 4, in which part of fused silica to be used had an average particle diameter of 0.1 mm or less. In addition, it was revealed that the ratio of deterioration caused by thermal shock obtained in each of Comparative Example 3 and Comparative Example 4 was not so different from those of Comparative Example 1 and Comparative Example 2, in each of which fused silica was not contained, shown in Tables 1 and 2. Based on the results, it was found that the setting of the average particle diameter of fused silica to fall within the range of more than 0.1 mm and less than 1.5 mm was able to significantly contribute to an improvement in ratio of deterioration caused by thermal shock.

With regard to Example 1, Comparative Example 3, and Comparative Example 4 listed in Table 3, the test for evaluating reaction resistance (corrosion resistance) was performed in addition to the tests described above. As a result, in each of Example 1, Comparative Example 3, and Comparative Example 4, the result was that there was no problem in terms of reaction resistance.

As described above, based on the test results of Examples and Comparative Examples shown in Tables 1 to 3, it was found that it was suitable for the composition for a heat treatment jig to contain alumina at a weight ratio within the range of 5% or more and 25% or less, mullite at a weight ratio within the range of 0% or more and 35% or less, cordierite at a weight ratio within the range of 15% or more and 30% or less, spinel at a weight ratio within the range of 0% or more and 35% or less, and fused silica at a weight ratio within the range of 15% or more and 50% or less. In addition, it was found that the average particle diameter of fused silica desirably fell within the range of more than 0.1 mm and less than 1.5 mm.

In addition, based on the test results of Examples and Comparative Examples shown in Tables 1 to 3, it was found that, when the composition for a heat treatment jig containing the components at the above-mentioned suitable composition ratios was molded and fired, a heat treatment jig having high durability against temperature changes was able to be provided.

In addition, based on the test results of Examples and Comparative Examples shown in Tables 1 to 3, it was found that, when the composition for a heat treatment jig which was obtained by blending alumina, cordierite, and fused silica, which contained the fused silica at a weight ratio within a range of 15% or more and 50% or less, and in which the fused silica had an average particle diameter of more than 0.1 mm and less than 1.5 mm was molded, followed by firing the resultant molded product, a heat treatment jig having a coefficient of thermal shock fracture resistance of 199 [K] or more was able to be manufactured.

In addition, based on the test results of Examples and Comparative Examples shown in Tables 1 to 3, it was found that, even when the above-mentioned composition for a heat treatment jig further contained any one or both of mullite and spinel, as long as the composition for a heat treatment jig contained other components at the above-mentioned suitable composition ratios, a heat treatment jig having high durability against temperature changes was able to be provided.

Further, based on the test results of Examples and Comparative Examples, it was found that a heat treatment jig manufactured by using the composition for a heat treatment jig containing the components at the above-mentioned suitable composition ratios was best suited for manufacturing a ceramic material for an active material for a lithium ion secondary battery containing lithium oxide through firing. Specifically, even when the heat treatment jig manufactured by the above-mentioned manufacturing method is subjected to treatment, such as forced air cooling, under the state of still having high temperature (e.g., high temperature of about 500° C.) while housing, for example, an active material for a lithium ion secondary battery, the heat treatment jig is less liable to undergo breakage or the like. In addition, the heat treatment jig manufactured by the above-mentioned manufacturing method has high corrosion resistance to lithium contained in a lithium-containing compound. Accordingly, the heat treatment jig manufactured by the above-mentioned manufacturing method is suitable for manufacturing an active material for a lithium ion secondary battery.

The composition for a heat treatment jig, and the method of manufacturing a heat treatment jig of the present invention can be suitably utilized as a material for a general jig to be used for heat treatment, and a manufacturing method therefor. In addition, the method of manufacturing an active material for a lithium ion secondary battery of the present invention can be suitably utilized for manufacturing of a general active material for a lithium ion secondary battery.

What is claimed is:

1. A composition for a heat treatment jig, comprising:
    alumina at a weight ratio within a range of 5% or more and 25% or less;
    mullite at a weight ratio of 0% or more and 35% or less;
    cordierite at a weight ratio within a range of 15% or more and 35% or less;

spinel at a weight ratio within a range of 0% or more and 35% or less; and fused silica at a weight ratio within a range of 35% or more and 50% or less.

2. The composition for a heat treatment jig according to claim 1, wherein the fused silica has an average particle diameter within a range of more than 0.1 mm and less than 1.5 mm.

3. A method of manufacturing a heat treatment jig, comprising:

molding the composition for a heat treatment jig of claim 1; and firing the resultant molded product.

* * * * *